United States Patent
Fujii et al.

(10) Patent No.: US 6,596,243 B1
(45) Date of Patent: Jul. 22, 2003

(54) CATALYST ELEMENT FOR PURIFYING EXHAUST GASES FROM INTERNAL COMBUSTION ENGINE

(75) Inventors: Jun Fujii, Saitama-ken (JP); Toshiya Kunisaki, Saitama-ken (JP); Masaharu Nakamori, Saitama-ken (JP); Hiroshi Kato, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 507 days.

(21) Appl. No.: 09/588,678

(22) Filed: Jun. 6, 2000

Related U.S. Application Data

(63) Continuation-in-part of application No. 08/877,732, filed on Jun. 18, 1997, now abandoned.

(30) Foreign Application Priority Data

Jun. 20, 1996 (JP) .............................................. 8-160271

(51) Int. Cl.[7] .......................... B01D 53/94; F01N 3/10; B01J 23/54
(52) U.S. Cl. ...................... 422/177; 422/180; 502/439; 502/325
(58) Field of Search ................................ 422/171, 177, 422/179, 180, 211, 222, 221, 218; 60/290; 502/439, 527.12, 527.14, 325; 428/116, 592, 594

(56) References Cited

U.S. PATENT DOCUMENTS

| | | | |
|---|---|---|---|
| 3,248,250 A | 4/1966 | Collins, Jr. ............... | 106/286.2 |
| 3,891,575 A | 6/1975 | Brautigam et al. .......... | 422/180 |
| 4,426,319 A | 1/1984 | Blanchard et al. .......... | 502/241 |
| 4,711,009 A | 12/1987 | Cornelison et al. ......... | 422/180 |
| 5,151,254 A | 9/1992 | Arai et al. .................. | 422/180 |
| 5,208,206 A | 5/1993 | Yasaki et al. ............... | 502/334 |
| 5,332,554 A | 7/1994 | Yasaki et al. ............... | 422/180 |
| 5,480,622 A | 1/1996 | Narula et al. ............... | 422/174 |
| 5,510,086 A | 4/1996 | Hemingway et al. ....... | 422/171 |
| 5,674,461 A | 10/1997 | Kato et al. .................. | 422/179 |

FOREIGN PATENT DOCUMENTS

| | | |
|---|---|---|
| EP | 0315253 A1 | 5/1989 |
| EP | 20399201 | 11/1990 |
| JP | 8912/1975 | 1/1975 |
| JP | 117816/1979 | 12/1979 |
| JP | 3-85318 | 4/1991 |
| JP | 3-157143 | 7/1991 |

OTHER PUBLICATIONS

Database EPI, Section Ch, Week 9650, Derwent Publications Ltd., London, GB; Classes H06, AN90–228554, XP002063753 & JP 02553678B (Matsushita Elec. Ind. Co., Ltd.), Nov 13, 1996, Abstract.

*Primary Examiner*—Hien Tran
(74) *Attorney, Agent, or Firm*—Armstrong, Westerman & Hattori, LLP

(57) ABSTRACT

In a catalyst element for purifying exhaust gases having a metallic carrier and a catalyst carrying layer, an undercoat layer is formed by coating the surface of the carrier with a heat resistant inorganic oxide which is superior in adhesion to a metal. The catalyst carrying layer is then formed by carrying platinum (Pt) and rhodium (Rh) on an alumina layer. The catalyst carrier layer can thus be adhered in a close and better contact with the carrier via the undercoat layer. Even when the carrier is subjected to thermal expansion and vibrations, the amount of peeling of the platinum and rhodium off (or away from) the carrier can be minimized. Consequently, the decrease in the purifying characteristics can be minimized.

6 Claims, 3 Drawing Sheets

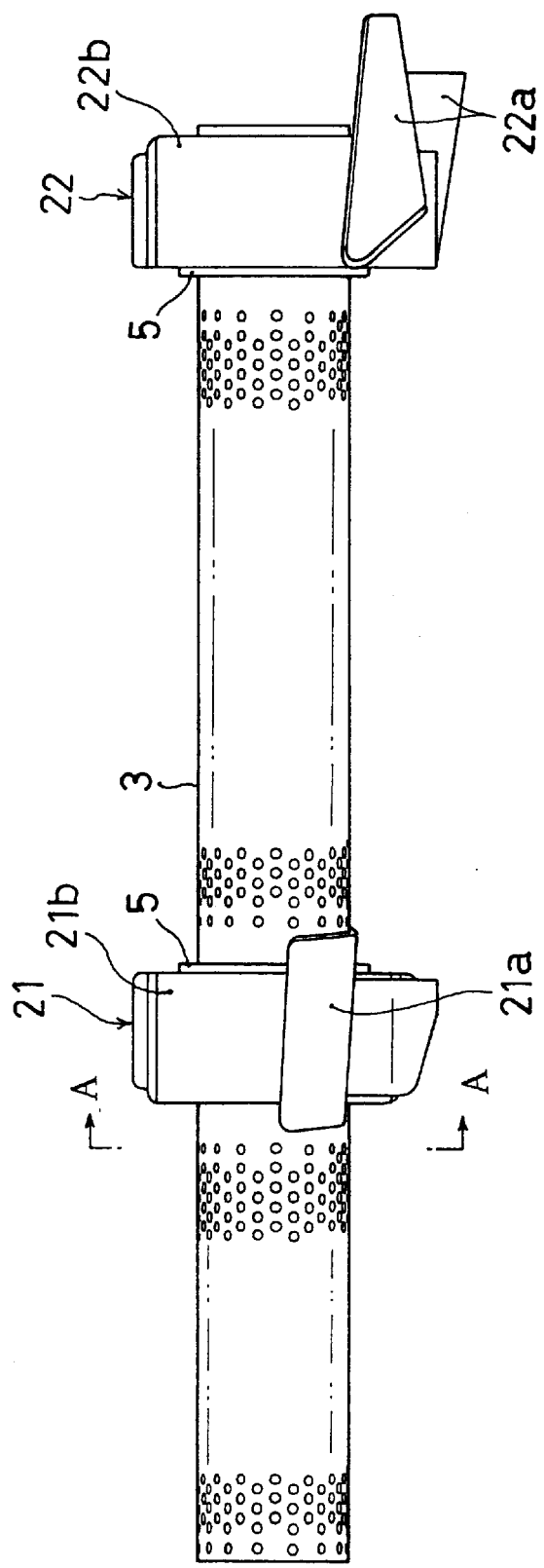

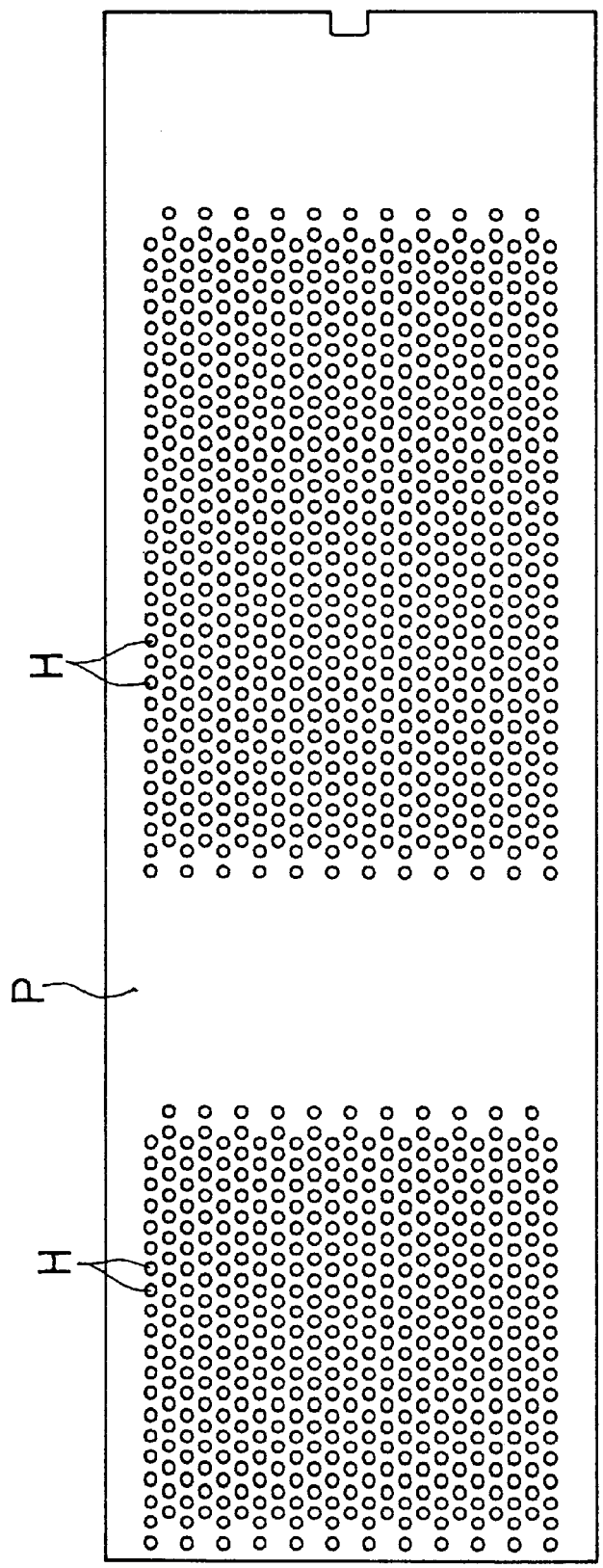

CATALYST ELEMENT FOR PURIFYING EXHAUST GASES FROM INTERNAL COMBUSTION ENGINE

This application is a continuation-in-part application of U.S. Ser. No. 08/877,732, filed Jun. 18, 1997 now abandoned.

BACKGROUND OF THE INVENTION

1. Field of the Invention

The present invention relates to a catalyst element for purifying exhaust gases from an internal combustion engine. It relates, in particular, to a catalyst element for purifying exhaust gases (hereinafter also simply called a catalyst element) which is superior in heat resisting property and in resistance against vibrations, and which is capable of performing superior purifying characteristics even under severe thermal conditions and vibrating conditions.

2. Description of the Related Art

In a motorcycle and a four-wheeled vehicle, a catalyst element is disposed in an flow passage of exhaust gases in order to reduce the contents of carbon monoxide (CO), hydrocarbons (HC), or the like in the exhaust gases from an internal combustion engine thereof.

As a catalyst element, there is generally known a three-way catalyst which is made by coating a metallic honeycomb-shaped carrier (or substrate) made, for example, of a heat-resistant stainless steel with a catalytic substance containing precious metals. As a catalyst element for use in a two-wheeled vehicle such as a motorcycle, there is known one in which an exhaust pipe is directly coated on its internal surface with a catalytic substance (see Japanese Published Unexamined (i.e., publicly laid-open) Patent Application No. 8912/1975) or one in which a catalytic substance is carried on (or contained in) a fabric carrier (or substrate) made of knitting or weaving a fibrous heat-resistant inorganic oxide (see Japanese Published Unexamined Patent Application No. 117816/1979).

Among the above-described catalyst elements, in the catalyst element in which the catalytic substance is directly carried on the metallic carrier, the catalytic substance is likely to be peeled off the carrier due to a thermal expansion or vibrations of the base material (e.g., stainless steel) which constitutes the carrier. In the catalyst element in which the carrier is made of a fabric material, on the other hand, the catalytic substance is likely to be peeled off the carrier due to vibrations and due to wear that is caused by the vibrations. Both of the above-described catalyst elements have therefore a disadvantage in that the purifying capacity will consequently be decreased. They have both a disadvantage in that the durability is poor and therefore that a sufficient exhaust gas purifying capacity will cease to be obtained when used in a vehicle, particularly in a motorcycle, for services under severe conditions such as repeated heating and cooling as well as vibrations.

In order to eliminate this kind of disadvantages by increasing the adhering strength between the metallic carrier and the catalytic substance, there is known a catalyst element in which a metallic carrier is coated on its surface with alumina by means of plasma spraying, whereby the catalytic substance is carried on the plasma-sprayed layer (see Japanese Published Unexamined Patent Application No. 85318/1991). In case a hollow carrier, for example, is used in this prior art, it is not possible to sufficiently and uniformly spray the inner peripheral surface of the carrier with alumina by plasma spraying. It has therefore a problem in that there is a limitation or restriction to the shape of the carrier that can be employed in carrying out this prior art.

Further, there is also known a catalyst element in which a catalytic substance is adhered to the surface of a ferritic stainless steel containing aluminum which has formed on its surface alumina whiskers by heat treatment at a high temperature (see Japanese Published Unexamined Patent Application No. 157143/1991). However, in order to obtain a good shape of alumina whiskers, there is a limitation or restriction to the material that can be used. Any one of the above-described catalyst elements is expensive for use as a catalyst element for purifying exhaust gases in an vehicle, especially a motorcycle, and is therefore not suitable for practical use.

The present invention has an object of solving the above-described.problems by providing a catalyst element for purifying exhaust gases from an internal combustion engine, in which a catalytic substance is carried on or held in a metallic carrier at a high strength of adhesion and which performs high purifying characteristics under severe conditions of high temperature and vibrations such as are encountered in a motorcycle or a four-wheeled vehicle.

SUMMARY OF THE INVENTION

In order to attain the above and other objects, the present invention is a catalyst element for purifying exhaust gases having a metallic carrier and a catalyst carrying layer, characterized in that a coating layer of a heat resistant inorganic oxide is formed on a surface of the metallic carrier; and that the catalyst carrying layer is formed on the coating layer.

The heat resistant inorganic oxide is superior in the characteristics of adhesion to metal and functions as an adhesive agent to adhere the catalyst carrying layer to the metallic carrier. The catalyst carrying layer can thus be adhered to the carrier at a high peeling strength (i.e., a high strength of resistance to peeling off). As a result, the amount of peeling of the catalytic substance in the catalyst carrying layer when the carrier is subjected to thermal expansion and vibrations can be minimized.

In addition, by forming the coating layer of heat-resistant inorganic oxide, the heat resisting property of the carrier is improved and also the carrier is protected against strong acid or chloride ion. Therefore, the resisting property against corrosion and acid is improved, resulting in an improvement in the durability.

The metallic carrier may be made in various shapes such as a plate shape, a tube shape, or a honeycomb shape. However, if it is made of a heat-resistant stainless steel thin plate with perforations, the heat resisting property is improved. Further, since perforations are formed by punching the stainless steel plate, a larger surface area can be obtained and thus the characteristics of purifying the exhaust gases are improved. In addition, since the exhaust resistance inside the exhaust pipe becomes small, the catalyst element is suitable for use in a motorcycle or a motor vehicle.

Among the heat-resistant inorganic oxides, alumina, silica, aluminum silicate and alkali metal silicate have a high strength of adhesion to a metallic surface. Therefore, if the heat resistant inorganic oxide is one or more selected from the group consisting of alumina, silica, aluminum silicate, and alkali metal silicate, a high adhesive strength can be obtained. It also functions well as an adhesive agent between the carrier and the catalyst carrying layer.

Further, the catalyst carrying layer preferably comprises: one or more of precious metals of platinum (Pt), palladium (Pd), and rhodium (Rh); and a metallic oxide containing activating alumina as its chief component.

Still furthermore, a total amount of the precious metal or metals carried on the catalyst carrying layer is preferably 2 g or more per unit surface area of 1 m² of the catalyst carrying layer, and a ratio by weight of the precious metals, where platinum and rhodium are carried, is preferably 20 parts of platinum (Pt) to 1 through 4 parts of rhodium (Rh).

In addition, a particularly preferred catalyst element for purifying exhaust gases comprises a metallic carrier and a catalyst carrying layer, and a coating layer of a heat resistant inorganic oxide formed on a surface of said metallic carrier; wherein said metallic carrier is a cylindrical member with a plurality of perforations, said catalyst carrying layer is formed on said coating layer; and said heat resistant inorganic oxide includes alkali metal silicate and at least one selected from the group consisting of alumina, silica and aluminum silicate, said heat resistant inorganic oxide including sodium oxide ($Na_2O$) from 0.7 to 4.5 percent by weight.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 2 is a side view of that catalyst element for purifying exhaust gases which is supported by supporting members;

FIG. 4 is a side view showing a catalyst element and collar portions mounted on the catalyst element;

FIG. 5 is a plan view showing a heat-resistant stainless steel which is a raw material for the carrier.

DETAILED DESCRIPTION OF PREFERRED EMBODIMENTS

Detailed explanation will now be made about the present invention with references to preferred embodiments.

Figure 1:
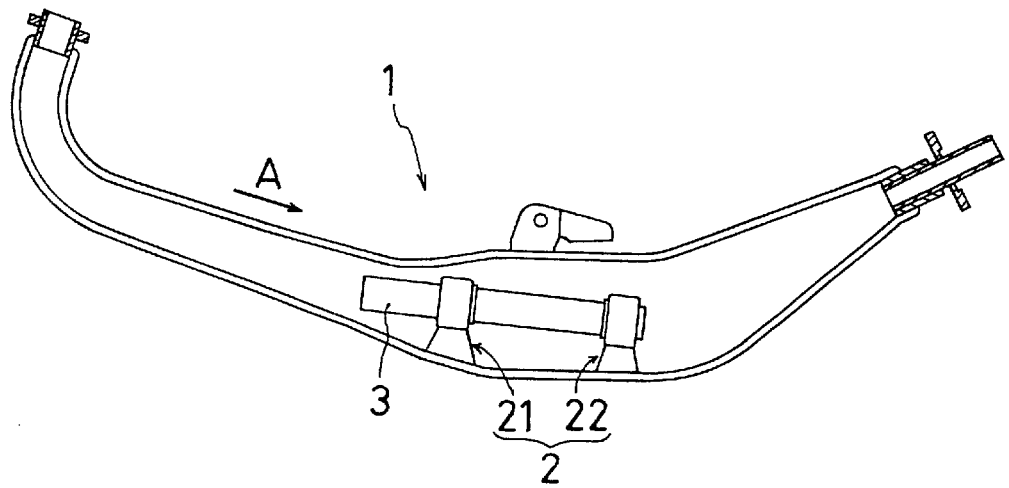
FIG. 1 is a side view of that catalyst element for purifying exhaust gases which is disposed in an exhaust pipe.
Figure 3:
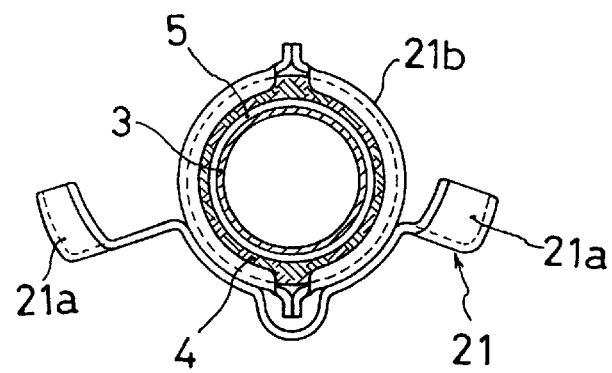
FIG. 3 is a sectional view taken along the line A—A in FIG. 2.

With reference to FIGS. 1—4, reference numeral 1 denotes an exhaust pipe which is coupled to an exhaust port of an engine, particularly a two-cycle engine, which is mounted on a motorcycle. Inside the exhaust pipe 1 there is mounted an approximately cylindrical catalyst element 3 for purifying exhaust gases (hereinafter also simply called a catalyst element 3), by means of a set of supporting legs 21, 22 which are provided on an upstream side and on a downstream side of the flow of exhaust gases as shown by an arrow "A." each of the supporting legs 21, 22 is fixed to the exhaust pipe 1 by means of welding or the like at a base end portion 21a, 22a thereof. On an end portion (i.e., upper end as seen in FIG. 3) of each of the legs, there is provided a cylindrical holding portion 21b, 22b.

Each of the holding portions 21b, 22b has mounted therein a circular shock absorbing member 4. The catalyst element 3 is held by the holding portions 21b, 22b via the shock absorbing members 4 to thereby attenuate the vibrations to be transmitted to the catalyst element 3. These shock absorbing members 4 are each formed into a net shape by knitting or weaving stainless steel wires into meshes. One layer of net or several woven layers of nets are used in a single fold or in several folds. The cylindrical holding portions 21b, 22b of the supporting legs 21, 22 are disposed coaxially with the catalyst element 3 so that the catalyst element 3 of approximately cylindrical shape can be held therein. The catalyst element 3 of approximately cylindrical shape is in contact with the shock absorbing member 4 inside the holding portions 21b, 22b at collar portions 5 which are mounted on an outer periphery of the catalyst element 3. Engaging claws (not illustrated) which are formed in the holding portions 21b, 22b are engaged with an end surface of each of the collar portions 5 so that the catalyst element 3 can be prevented from deviating or moving in the longitudinal direction.

EXAMPLE 1

The catalyst element 3 uses, as its carrier 30 (or substrate), a plate member P made of stainless steel (in this Example SUS 430 in JIS, Japanese Industrial Standards, was used) of so-called punched metal, as shown in FIG. 5, in which a large number of punched perforations H are formed. The carrier 30 was made by fabricating a plate member P of stainless steel of 1 mm thick, having perforations H of 2 mm in diameter arranged at a pitch of 3.5 mm, into a cylindrical shape of 25 mm in inner diameter and 260 mm in length.

Figure 6:
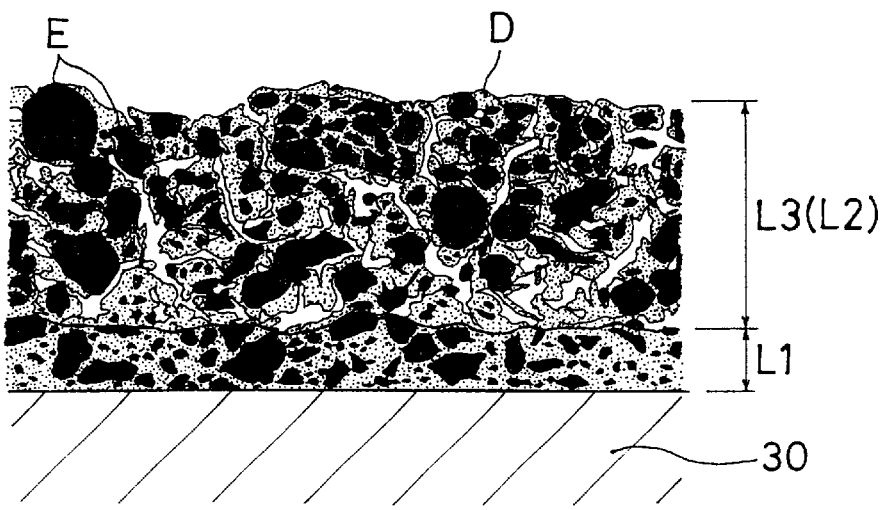
FIG. 6 is a schematic view showing the structure of a silica coating which is formed on the surface of the carrier of the catalyst element for purifying exhaust gases as well as a catalyst carrying layer which is formed on the silica coating.

The carrier 30 was dipped into a slurry of a silica base adhesive agent, was then pulled out of the slurry and was blown with an air blower to remove surplus slurry. It was then dried with hot air of 150° C. to thereby form, on an entire surface of the carrier, an undercoat layer L1 which is a coating layer of silica (see FIG. 6). Here, the term "entire surface" means an inner surface and an outer surface of the carrier 30 as well as the surfaces of the side walls of the perforations H. Then, by using activated alumina slurry (35% concentration of solids), the undercoat layer L1 was coated thereon with an alumina layer L2 in similar treatments as those used in forming the undercoat layer L1. The article (or article of manufacture) thus obtained was thereafter sintered at 450° C. for 1 hour.

Then, the carrier 30 having formed thereon the alumina layer L2 was dipped into a nitric acid solution containing therein platinum and rhodium. It was then pulled out of the solution and was dried with hot air of 100° C. for 10 minutes. Thereafter, it was sintered at 450° C. for 1 hour. Platinum and rhodium which are the catalytic substances D were carried on (or held in) the alumina layer L2 to thereby form a catalyst carrying layer L3 which carried thereon or therein platinum (Pt) and rhodium (Rh). Inside the alumina layer L2 which was formed on the undercoat layer L1, there was formed cavities or pores. Platinum and rhodium were carried on the surfaces of alumina E inside and outside the alumna layer L2.

Catalyst element identified as Sample 3A was obtained by performing this kind of treatments on the carrier. This catalyst element 3A was found to carry therein 42 g (grams) of silica, 56 g of alumina, 2.0 g of platinum and 0.4 g of rhodium per unit area (1 m²) of the surface of the carrier 30.

EXAMPLE 2

In place of the activated alumina slurry that was used in Example 1, the activated alumina slurry with an addition of cerium oxide was used in carrying out treatments similar to those in Example 1, whereby an alumina layer L2 was formed. Platinum and rhodium were similarly carried on or held in this alumina layer L2 to thereby obtain a catalyst element identified as Sample 3B. This catalyst element 3B was found to carry therein 42 g of silica, 48 g of alumina, 10 g of cerium oxide, 2.1 g of platinum, and 0.4 g of rhodium per unit area (1 $m^2$) of the surface of the carrier 30.

In both of the above-described Examples 1 and 2, the formation of the undercoat layer L1 and the alumina layer L2 as well as the carrying of platinum and rhodium were carried out by simple treatments in the form of dipping. Therefore, the treatment works are easy.

A total carrying amount of precious metals of platinum, palladium, and rhodium to be carried on the surface of the carrier 30 is preferably 2 g or more per unit (1 $m^2$) of the surface of the carrier 30. In case platinum and rhodium are carried as in the above-described two Examples 1 and 2, the weight ratio thereof is preferably 20 parts of platinum to 1 through 4 parts of rhodium.

COMPARATIVE EXAMPLE

A catalyst element identified as Sample 3C was obtained by omitting the treatment of forming the undercoat layer L1 from the treatments in the Example 1. This catalyst element 3C was found to carry 57 g of alumina, 2.2 g of platinum, and 0.4 g of rhodium per unit area (1 $m^2$) of the surface of the carrier 30.

Test 1

Initial weight of each of the above-described catalyst elements identified as Samples 3A, 3B, 3C was measured first. Then, heat treatment steps of holding each catalyst element in an electric furnace held at 800° C. for 30 minutes and thereafter cooling it outside the furnace for 30 minutes were carried out two times. Each catalyst element was thereafter heated once again under the same heating conditions as above, was taken out of the furnace, and was then rapidly cooled by dipping it into water. Each catalyst element was subsequently subjected to ultrasonic treatment in an ultrasonic cleaning apparatus filled with pure water for 30 minutes and was thereafter dried at 200° C. Weight of each of the catalyst elements was then measured again, and a comparison was made between the weight before the treatments and the weight after the treatments in order to measure the amount of peeling off of the catalytic substances. The peeling strength (i.e., the strength to resist the peeling off) was thus evaluated and the results are given in Table 1.

TABLE 1

| Catalyst element | Initial weight (g) | Weight after US washing (g) | Amount of peeling (g) | Ratio of peeling (%) |
|---|---|---|---|---|
| 3A | 179.343 | 179.307 | 0.036 | 0.91 |
| 3B | 178.854 | 178.814 | 0.040 | 0.98 |
| 3C | 176.306 | 174.756 | 1.550 | 65.03 |

As can be seen from Table 1 as compared with the catalyst element identified as Sample 3C of the Comparative Example, the catalyst elements identified as Samples 3A, 3B according to the present invention have been found to have superior peeling strength against the thermal load and vibrations that are added by heat cycles and rapid cooling by dipping into water.

Test 2

Each of the catalyst elements identified as Samples 3A, 3B, 3C was cut into a length of 80 mm and was then subjected to the same treatments as in Test 1 in order to obtain test catalyst elements. A model gas was purified with these test catalyst elements. Measurements were made of the ratio of reduction (i.e., purification ratio) of hydrocarbons (HC) and carbon monoxide (CO) in the model gas, and the purifying characteristics of each of the catalyst elements identified as Samples 3A, 3B, 3C were evaluated. The condition of evaluations were as follows. The results of evaluation are give in Table 2.

Conditions

Test model gas: CO 1.50%, $C_3H_6$ 3000 ppm, NO 500 ppm, $H_2$ 0.5%, $O_2$ 1.74%, $CO_2$ 11% (balance is $N_2$)

Space velocity: 17000/hr

Evaluation temperature: 400° C.

TABLE 2

| Catalyst element | HC purifying ratio (%) | CO purifying ratio (%) |
|---|---|---|
| 3A | 61.8 | 60.5 |
| 3B | 65.7 | 70.9 |
| 3C | 28.0 | 42.1 |

As can be seen from Table 2, in the purifying test of test catalyst elements using the model gas, the catalyst elements identified as Samples 3A, 3B of the present invention were found to have maintained purifying characteristics even after the heating and vibrating treatments shown in Test 1 and were found to have superior durability characteristics.

Test 3

Catalyst elements.identified as Samples 3A, 3B, 3C were respectively disposed in an exhaust pipe of a motorcycle having mounted thereon a single cylinder, two-stroke engine of 125 cc in piston displacement. After running the motorcycle at a constant speed of 100 km/hr for 100 hours (equivalent to a total of 10000 km of traveling distance) on a dynamometer car, the purifying ratios of hydrocarbons (HC) and carbon monoxide (CO) at running in ECE (European Economic Commission) Regulation Mode 40 were measured and the results thereof are given in Table 3.

TABLE 3

| Catalyst element | HC purifying ratio (%) | CO purifying ratio (%) |
|---|---|---|
| 3A | 40 | 50 |
| 3B | 50 | 55 |
| 3C | 5 | 10 |

As can be seen from Table 3, the catalyst elements identified as Samples 3A, 3B of the present invention were found to have superior-durability characteristics also from the purifying ratios at running in ECE Regulation Mode 40 after running 10000 km on the dynamometer car.

EXAMPLE 3

Experiments were conducted to obtain data for catalyst elements containing alkali metal silicates according to the subject invention and for catalyst elements not containing such alkali metal silicates to show the difference in the "ratio of peeling" between such catalyst elements. The experiments were conducted by preparing catalyst elements according to the procedures in Example 2 above.

For each of the catalyst elements of experiments, various properties for the catalyst were determined. In particular, the "ratio of peeling" was determined by the same method as Test 1 above. In addition, the activity of each of the catalyst elements was evaluated by the same method as Test 2 above. The results of all of these determinations are set forth in Table 4.

TABLE 4

| | Pre-Coating Materials | | | Peeling Test | | | | Activity Test | |
|---|---|---|---|---|---|---|---|---|---|
| | $Na_2O \cdot xSi_2O$, $SiO_2$ | | | | Weight | | | | |
| | $Al_2O_3 \cdot xSiO_2$, $Al_2O_3$ | | | | after | | | HC | CO |
| Catalyst Element | $Na_2O$ content (wt %) | $SiO_2$ content (wt %) | $Al_2O_3$ content (wt %) | Initial weight (g) | ultrasonic washing (g) | Amount of peeling (g) | Ratio of peeling (%) | purifying ratio (%) | purifying ratio (%) |
| 3A | 0.0 | 99.8 | 0.2 | 181.530 | 180.285 | 1.245 | 30.44 | 43.5 | 48.2 |
| 4A | 0.7 | 99.1 | 0.2 | 179.343 | 179.307 | 0.036 | 0.910 | 61.8 | 60.5 |
| 4B | 4.5 | 95.4 | 0.1 | 180.253 | 180.234 | 0.019 | 0.451 | 58.1 | 57.2 |

From the above experimental results, it can be observed that, for example, with the addition of 4.5% $Na_2O$, the ratio of peeling (%) is significantly lowered to 0.451% as compared with 0.91% peeling ratio with the addition of 0.7% $Na_2O$. Further, it can be observed that these peeling ratios obtained with the inclusion of $Na_2O$ are significantly lower than the 30.44% peeling ratio when $Na_2O$ is not included in the catalyst elements at all. From these experimental results, it can be concluded that, among other things, in the catalyst elements according to the subject invention, the ratio of peeling (%) is significantly decreased with the inclusion of $Na_2O$ and, furthermore, the ratio of peeling is considerably lower as compared with catalyst elements which do not contain $Na_2O$, that is, which contain no alkali metal silicates.

As can be seen from the above-described explanations, according to the present invention, the peeling strength of the catalyst substances off (or away from) the carrier under several thermal and vibrating conditions can be improved. Therefore, when the catalyst element for purifying the exhaust gases is used under the above-described conditions, the amount of peeling of the catalytic substances away from the carrier can be minimized. As a consequence, the catalytic substances carried on the carrier can be used for the purpose of purification of the exhaust gases for a long period of time. The decrease in the purifying characteristics can thus be minimized and the durability can be improved.

It is readily apparent that the above-described catalyst element for purifying exhaust gases meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A catalyst element for purifying exhaust gases comprising a metallic carrier and a catalyst carrying layer, and a coating layer of a heat resistant inorganic oxide formed on a surface of said metallic carrier; wherein
said metallic carrier is a cylindrical member with a plurality of perforations,
said catalyst carrying layer is formed on said coating layer; and
said heat resistant inorganic oxide includes alkali metal silicate and at least one selected from the group consisting of alumina, silica and aluminum silicate, said heat resistant inorganic oxide including sodium oxide ($Na_2O$) from 0.7 to 4.5 percent by weight.

2. A catalyst element according to claim 1, wherein said carrier is made of a heat-resistant stainless steel plate.

3. A catalyst element according to claim 1, wherein said catalyst carrying layer comprises: one or more of precious metals of platinum (Pt), palladium (Pd), and rhodium (Rh); and a metallic oxide containing activated alumina as its chief component.

4. A catalyst element according to claim 3, wherein a total amount of said precious metal or metals carried on said carrier is 2 grams or more per unit surface area of 1 m² of said catalyst carrying layer.

5. A catalyst element according to claim 3 wherein a ratio by weight of said precious metals, where platinum (Pt) and rhodium (Rh) are carried, is 20 parts of platinum to 1 through 4 parts of rhodium.

6. A catalyst element according to claim 4 wherein a ratio by weight of said precious metals, where platinum (Pt) and rhodium (Rh) are carried, is 20 parts of platinum to 1 through 4 parts of rhodium.

* * * * *